US009493955B1

(12) United States Patent
Christian

(10) Patent No.: US 9,493,955 B1
(45) Date of Patent: Nov. 15, 2016

(54) SNOW GUARD ASSEMBLY FOR STANDING SEAM METAL ROOF

(71) Applicant: Vernon D Christian, Mansfield, OH (US)

(72) Inventor: Vernon D Christian, Mansfield, OH (US)

( * ) Notice: Subject to any disclaimer, the term of this patent is extended or adjusted under 35 U.S.C. 154(b) by 0 days.

(21) Appl. No.: 14/698,905

(22) Filed: Apr. 29, 2015

(51) Int. Cl.
*E04D 13/10* (2006.01)
*E04D 3/30* (2006.01)
*F24J 2/52* (2006.01)

(52) U.S. Cl.
CPC .............. *E04D 13/10* (2013.01); *E04D 3/30* (2013.01); *F24J 2/5249* (2013.01)

(58) Field of Classification Search
CPC ........... E04D 13/10; E04D 3/30; F24J 2/5249; E04G 21/3261; E04G 21/3285
USPC ........................................ 52/24, 25
See application file for complete search history.

(56) References Cited

U.S. PATENT DOCUMENTS

| 933,784 | A | | 9/1909 | Peter | |
|---|---|---|---|---|---|
| 2,201,320 | A | | 1/1940 | Place | |
| 6,070,368 | A | * | 6/2000 | Anderson | E04D 13/10 52/24 |
| 6,453,623 | B1 | * | 9/2002 | Nelson | E04D 13/10 411/432 |
| 6,688,047 | B1 | * | 2/2004 | McNichol | E04D 13/10 52/25 |
| 6,834,466 | B2 | * | 12/2004 | Trevorrow | E04D 13/10 248/512 |
| 7,487,617 | B2 | | 2/2009 | Hockman | |
| 8,607,507 | B2 | * | 12/2013 | Anderson | E04D 3/362 248/535 |
| 8,844,234 | B2 | * | 9/2014 | Haddock | E04F 13/0821 52/463 |
| 9,085,900 | B2 | * | 7/2015 | Haddock | E04C 2/38 |
| 2013/0145711 | A1 | * | 6/2013 | Haddock | E04F 13/0821 52/478 |
| 2014/0311087 | A1 | * | 10/2014 | Haddock | E04C 2/38 52/801.1 |

FOREIGN PATENT DOCUMENTS

| JP | 11131728 A | * | 5/1999 | ............. E04D 13/10 |
|---|---|---|---|---|
| JP | 2001220869 A | * | 8/2001 | ............. E04D 13/10 |
| JP | 2002303024 A | * | 10/2002 | ............. E04D 13/10 |

* cited by examiner

*Primary Examiner* — Brent W Herring
(74) *Attorney, Agent, or Firm* — Renner Kenner Greive Bobak Taylor & Weber

(57) ABSTRACT

A snow guard assembly for a standing seam metal roof includes a first snow support bracket including a first bracket body secured to a first standing seam on the metal roof, and a second snow support bracket including a second bracket body secured to a second standing seam. The first and second snow support brackets are substantially aligned on the roof and removably receive an elongated snow support having a snow support surface extending upwardly relative to the panel of a roofing segment over which it is mounted such that the snow support surface will support snow accumulating on the standing seam metal roof and reduce its ability to slide off the standing seam metal roof.

17 Claims, 6 Drawing Sheets

SNOW GUARD ASSEMBLY FOR STANDING SEAM METAL ROOF

FIELD OF THE INVENTION

The present invention generally relates to snow guards. More particularly, the present invention relates to snow guards for standing seam metal roofs.

BACKGROUND OF THE INVENTION

Snow guards are structures that are mounted to a roof to prevent or decrease snow sheets falling off of the slope of the roof. Various types exist. Of particular relevance to the present invention, are snow guards employed for standing seam metal roofs.

With reference to FIG. 1, it can be seen that standing seam metal roof 10 is characterized by having a plurality of roofing segments 12, with each roofing segment typically having a panel 14 and a standing seam 16. The standing seams 16 are raised above the level of the panels 14 and form ridges with neighboring roofing segments 12. The panels 14 of the standing seam metal roof are typically quite smooth, and it will be appreciated that snow accumulating on such a roof can slide off in large masses for many reasons. Some snow guards are offered in the prior art for helping to prevent this.

Some snow guard assemblies for standing seam metal roofs exist but they are structurally distinguishable from the present snow guard assembly. For example, Hockman U.S. Pat. No. 7,487,617 and Peter U.S. Pat. No. 933,784 show snow guards in the form of small discrete snow supports located only over the standing seam to which they are secured. They do not teach elongated snow support members. Place U.S. Pat. No. 2,201,320 shows use of an elongated member, but it is integral with the structure used to mount it to the roof. The elongated member also is taught only to span a single roof segment. Based on the state of the art, the present invention provides various structural improvements in a snow guard assembly for standing seam metal roof.

SUMMARY OF THE INVENTION

In a first embodiment, the present invention provides a snow guard assembly on a standing seam metal roof. The standing seam metal roof has a plurality of roofing segments, each roofing segment having a panel and a standing seam forming a ridge with a neighboring roofing segment and the standing seams are raised above the level of the panels. The snow guard assembly comprises a first snow support bracket, a second snow support bracket and an elongated snow support separate and distinct from the first and second snow support brackets. The first snow support bracket includes a first bracket body secured to a first standing seam and has a first snow support receptacle. The second snow support bracket includes a second bracket body secured to a second standing seam and has a second snow support receptacle. The elongated snow support separate and distinct from the first and second snow support bracket, and elongate snow support is removably received in the first support receptacle and the second support receptacle. The elongated snow support has a snow support surface extending upwardly relative to the panel of a roofing segment over which it is mounted such that the snow support surface will support snow accumulating on the standing seam metal roof and reduce its ability to slide off the standing seam metal roof.

In a second embodiment, the present invention provides a snow guard assembly on a standing seam metal roof as in the first embodiment, wherein the first bracket body and is secured to a first standing seam without forming holes in the standing seam metal roof, and the second bracket body is secured to a first standing seam without forming holes in the standing seam metal roof.

In a third embodiment, the present invention provides a snow guard assembly on a standing seam metal roof as in either the first or second embodiment, wherein blunted mounting screws mount the first bracket body to the first standing seam, the blunted mounting screws mating with mounting screw apertures in the first bracket body and blunted mounting screws mount the second bracket body to the second standing seam, the blunted mounting screws mating with mounting screw apertures in the second bracket body.

In a fourth embodiment, the present invention provides a snow guard assembly on a standing seam metal roof as in any of the first through third embodiments, wherein the first bracket body is arch-shaped defining a channel that fits over the first standing seam and the second bracket body is arch-shaped defining a channel that fits over the second standing seam.

In a fifth embodiment, the present invention provides a snow guard assembly on a standing seam metal roof as in any of the first through fourth embodiments, wherein the first bracket body is formed of a single piece.

In a sixth embodiment, the present invention provides a snow guard assembly on a standing seam metal roof as in any of the first through fifth embodiments, wherein the first snow support receptacle includes an upper flange creating an upper overhang and an opposed lower flange creating a lower overhang.

In a seventh embodiment, the present invention provides a snow guard assembly on a standing seam metal roof as in any of the first through sixth embodiments, wherein the second snow support receptacle includes an upper flange creating an upper overhang and an opposed lower flange creating a lower overhang.

In an eighth embodiment, the present invention provides a snow guard assembly on a standing seam metal roof as in any of the first through seventh embodiments, wherein the elongated snow support has a mounted width at the first snow support receptacle such that the elongated snow support extends under the upper overhang thereof and under the lower overhang thereof.

In a ninth embodiment, the present invention provides a snow guard assembly on a standing seam metal roof as in any of the first through eighth embodiments, wherein the elongated snow support has a mounted width at the second snow support receptacle such that the elongated snow support is received under the upper overhang thereof and under the lower overhang thereof.

In a tenth embodiment, the present invention provides a snow guard assembly on a standing seam metal roof as in any of the first through ninth embodiments, wherein the elongated snow support is deformable at the first snow support receptacle such that the width at the first snow support receptacle can be decreased to avoid one of the upper overhang or the lower overhang to remove the elongate snow support from receipt in the first snow support receptacle.

In an eleventh embodiment, the present invention provides a snow guard assembly on a standing seam metal roof as in any of the first through tenth embodiments, wherein the elongated snow support is deformable at the second snow support receptacle such that the width at the second snow support receptacle can be decreased to avoid one of the upper overhang or the lower overhang to remove the elongate snow support from receipt in the second snow support receptacle.

In a twelfth embodiment, the present invention provides a snow guard assembly on a standing seam metal roof as in any of the first through eleventh embodiments, wherein the elongated snow support includes an upper mounting flange received under the upper overhang of said first snow support receptacle.

In a thirteenth embodiment, the present invention provides a snow guard assembly on a standing seam metal roof as in any of the first through twelfth embodiments, wherein the upper mounting flange is also received under the upper overhang of the second snow support receptacle.

In a fourteenth embodiment, the present invention provides a snow guard assembly on a standing seam metal roof as in any of the first through thirteenth embodiments, wherein the elongated snow support includes a lower mounting flange received under the lower overhang of the first snow support receptacle.

In a fifteenth embodiment, the present invention provides a snow guard assembly on a standing seam metal roof as in any of the first through fourteenth embodiments, wherein the lower mounting flange is also received under the lower overhang of the second snow support receptacle.

In a sixteenth embodiment, the present invention provides a snow guard assembly on a standing seam metal roof as in any of the first through fifteenth embodiments, wherein the snow support surface extends upwardly between the upper mounting flange and the lower mounting flange.

In a seventeenth embodiment, the present invention provides a snow guard assembly on a standing seam metal roof as in any of the first through sixteenth embodiments, wherein the elongated snow support has a length and the snow support surface extends along at least a portion of the length in a direction transverse to the direction of the ridge formed by a standing seam over which the elongate snow support is mounted.

In an eighteenth embodiment, the present invention provides a snow guard assembly on a standing seam metal roof as in any of the first through seventeenth embodiments, wherein the standing seam metal roof defines an upper ridge and a lower edge, and the snow support surface faces the upper ridge.

In a nineteenth embodiment, the present invention provides a snow guard assembly on a standing seam metal roof as in any of the first through eighteenth embodiments, wherein the elongated snow support extends over a plurality of roofing segments of the standing seam metal roof.

In a twentieth embodiment, the present invention provides a snow guard assembly on a standing seam metal roof as in any of the first through nineteenth embodiments, wherein the second snow guard bracket is substantially aligned with the first snow guard bracket.

DETAILED DESCRIPTION OF ILLUSTRATIVE EMBODIMENTS

Figure 1:
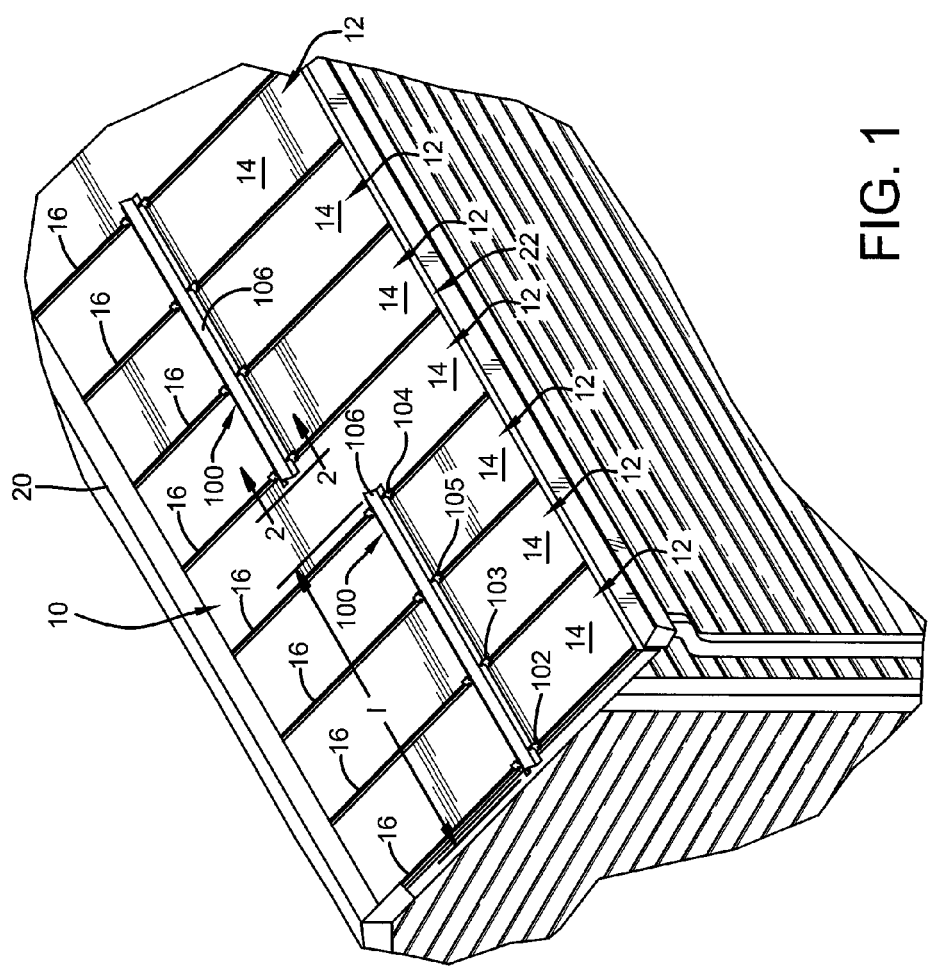
FIG. 1 is a perspective view of a standing seam metal roof with a snow guard of the present invention mounted thereto.

Referring to FIG. 1, a snow guard assembly 100 is shown on a standing seam metal roof 10. The snow guard assembly includes a first snow support bracket 102 and a second snow support bracket 104, with a separate and distinct elongated snow support 106 being removably received by the first and second snow support brackets 102, 104. In some embodiments, additional brackets such as third snow support bracket 103 and fourth snow support bracket 105 can provide further receptacles for the elongated snow support 106. The snow support brackets are shaped to fit over the standing seam 16 of the standing seam metal roof 10 and are secured in some embodiments, to their respective standing seams without forming holes in the standing seam metal roof 10. In some embodiments, the elongated snow support 106 can extend between two neighboring standing seams 16 to cover one roofing segment 12. In other embodiments, the elongated snow support 106 can extend over a plurality of roofing segments 12, and can be secured (using a snow support bracket) to any number of standing seams 16 over which it extends. In some embodiments, wherein the snow guard assembly 100 is employed on a standing seam metal roof 10 having 16 inch roofing segments 12 (i.e., wherein the distance between neighboring ridges of neighboring standing seams 16 is 16 inches) the elongated snow support 106 is provided at a length of 52 inches and is secured over 4 standing seams 16 with two or more snow support brackets 102, 104 (and/or 103, 105) with a 2 inch overhang at the outermost standing seams 16. This specific embodiment is shown in FIG. 1, with four snow support brackets 102, 103, 104 and 105 being employed, one on each standing seam 16 over which the elongated snow member 106 extends.

Figure 2:
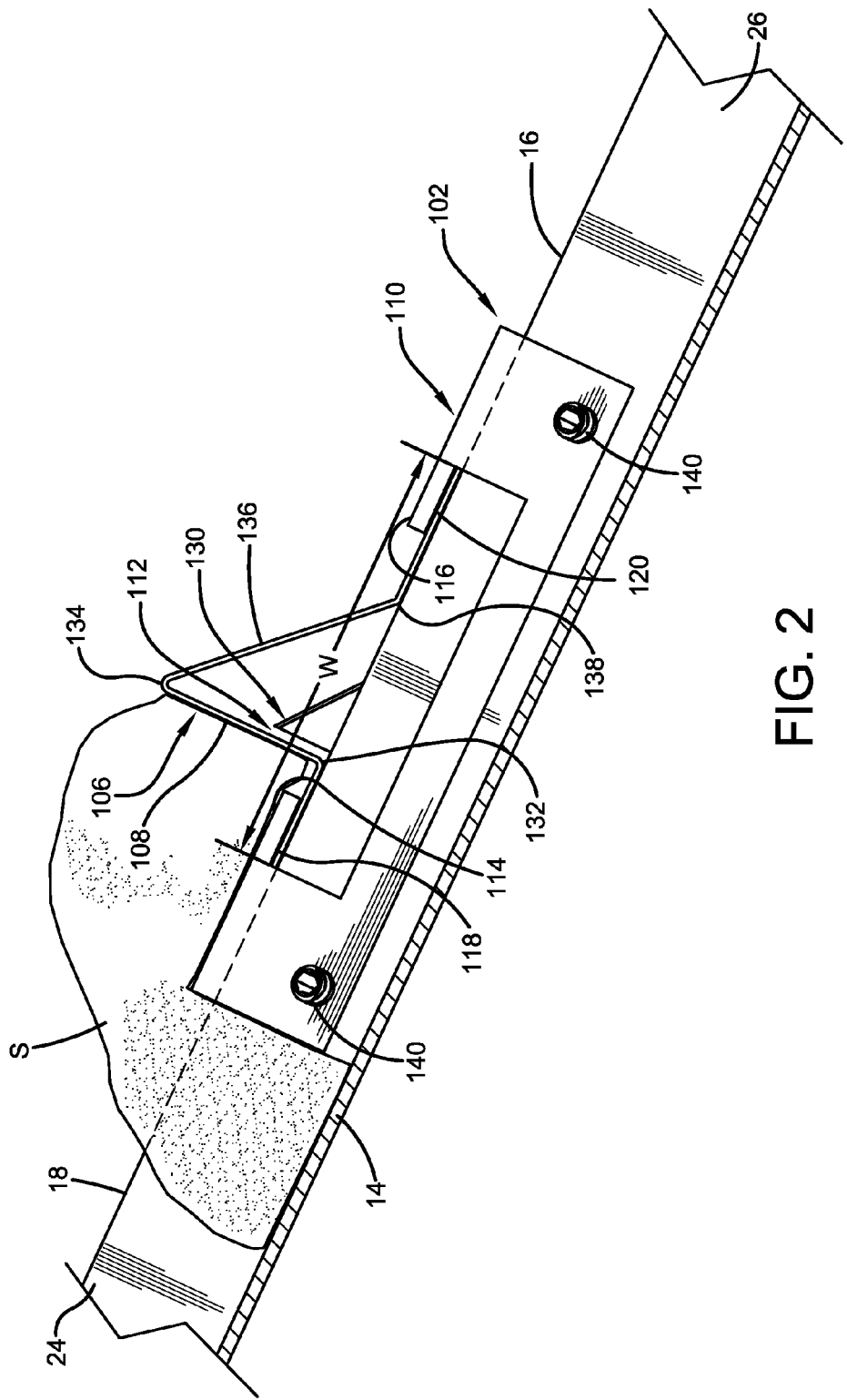
FIG. 2 is a cross section taken along the line 2-2 of FIG. 1, showing the interaction of a snow support bracket and an elongated snow support.
Figure 3:
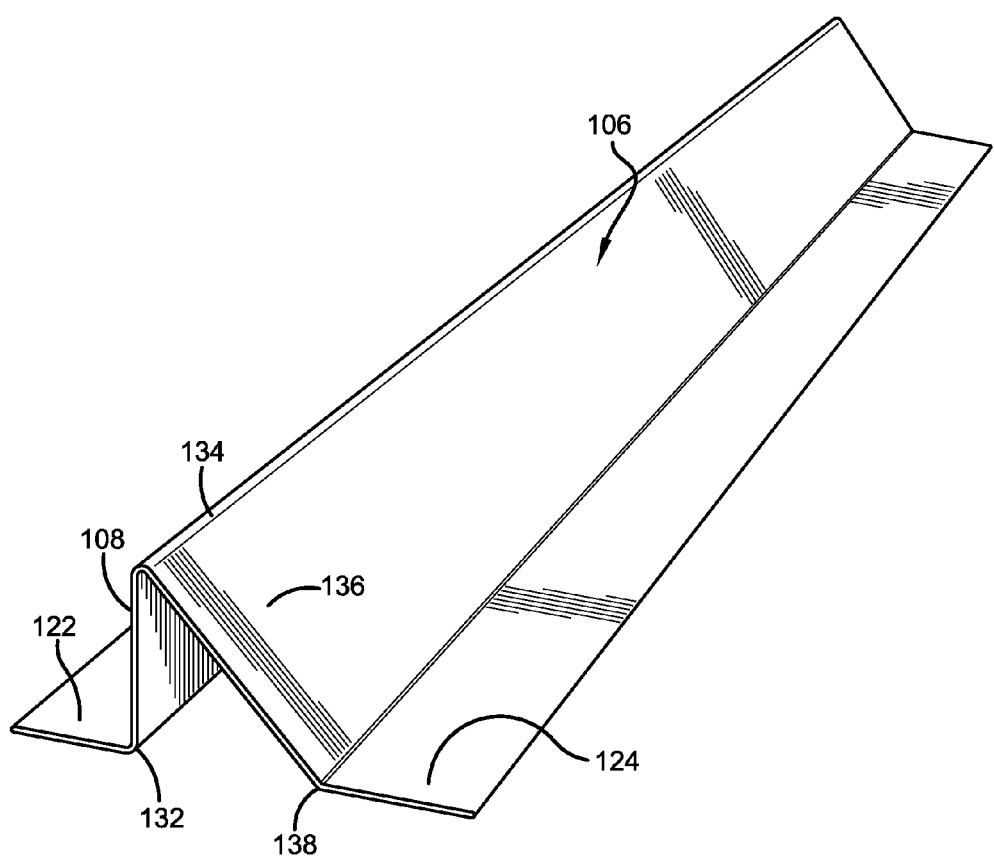
FIG. 3 is a perspective view of the elongated snow support.

Referring now to FIG. 2, the elongated snow support 106 includes a snow support surface 108 extending upwardly relative to the panel 14 of the roofing segments 12 over which it is mounted. This snow support surface 108 supports snow accumulating on the standing seam metal roof 10 to reduce the tendency for snow to slide off the standing seam metal roof 10. In some embodiments, the elongated snow support 106 has a length 1, and the snow support surface 108 extends along at least a portion of this length 1 in a direction transverse to the direction of the ridge 18 formed by a standing seam 16 over which the elongate snow support 106 is mounted. In some embodiments, this transverse direction is orthogonal to the direction of the ridge, as seen in FIG. 1. Further, in some embodiments, the standing seam metal roof 10 defines an upper ridge 20 and a lower ledge 22, and the snow support surface 108 faces the upper ridge 20. The snow support surface 108 provides a support for snow s against gravity. In FIG. 2, the snow support surface 108 is shown supporting a volume of snow S against gravity. The snow support surface 108 faces the high end 24 of the standing seam 16, which extends toward the upper ridge 20, while the low end 26 extends toward the lower edge 22.

Figure 4:
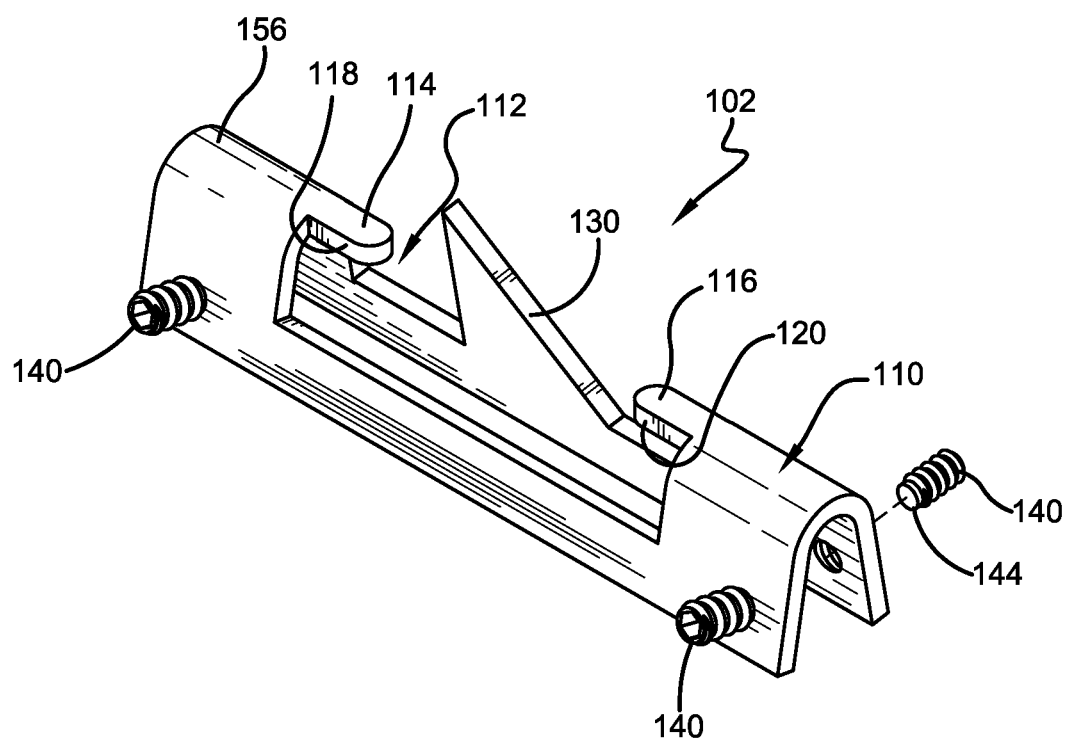
FIG. 4 is a perspective view of a snow support bracket.

With reference to FIG. 2, the first snow support bracket 102 is shown secured to a standing seam 16. In some embodiments, the bracket body 110 is arch-shaped, having opposed sidewalls defining a channel 111 (FIG. 4) that fits over the standing seam 116. The snow support bracket 102 includes a bracket body 110 structured to be secure to a standing seam 16. The bracket body 110 provides a snow support receptacle 112 that receives the elongated snow support 106. The snow support receptacle 112 includes an upper flange 114 and an opposed lower flange 116. The upper flange 114 creates an upper overhang 118 and the opposed lower flange 116 creates a lower overhang 120. Each snow support bracket employed to secure the elongated snow support 106 to the roof 10 will be similarly structured to have a snow support receptacle and function as described herein for first snow support bracket 102. In some embodiments, the snow support brackets are identical, which is preferable for mass productions of brackets.

The elongated snow support 106 has a mounted width W at its location of receipt in the snow support receptacle 110 such that the elongated snow support 106 extends under the upper overhang 118 and the lower overhang 120 and over the ridge 18 of the standing seam 16. This width w is repeated at every location of every snow support receptacle employed to secure the elongated snow support 106 so the elongated snow support 106 is received by the receptacles of the snow support brackets and secured to the roof 10. In a simple form, a first snow support bracket 102 and a second snow support bracket 104 are employed. The first snow support bracket includes a first bracket body secured to a first standing seam and having a first snow support receptacle, while the second snow support bracket includes a second bracket body secured to a second standing seam and having a second snow support receptacle. In some embodiments, the second snow support bracket 104 is substantially aligned with the first snow support bracket 102. The elongated snow support 106 is received in the first snow support receptacle and the second snow support receptacle. The elongated snow support 106 has the snow support surface 108 extending upwardly relative to the panel 14 of a roofing segment over which it is mounted such that the snow support surface 108 will support snow accumulating on the standing seam metal roof 10 and reduce the tendency for the snow to slide off the standing seam metal roof 10.

In some embodiments, all of the snow support brackets employed are identical such that each snow support bracket is understood as including a bracket body providing a snow support receptacle having a upper flange creating an upper overhang and an opposed lower flange creating a lower overhang, each interacting with the width of the elongated snow support as already described herein.

In some embodiments, the elongated snow support 106 has a constant width along its entire length. In some embodiments, the snow support brackets are first mounted to standing seams in a substantially aligned manner, and the elongated snow support 106 is slid in the direction of its length 1 through successive brackets to then mount the elongated snow support to the brackets.

As seen in FIG. 2, in some embodiments, the elongated snow support 106 has an upper mounting flange 122 received under the upper overhang 118 of a snow support receptacle (such as snow support receptacle 102). In some embodiments, the elongated snow support 106 also includes a lower mounting flange 124 received under the lower overhang 120 of a snow support receptacle. In some embodiments, this upper mounting flange 122 and lower mounting flange 124 is provided only at the location where the elongated snow support 106 interacts with a snow support bracket. In other embodiments, the upper mounting flange 122 and lower mounting flange 124 extend along at least a portion of the length 1 of the elongated support member 106 to interact with two or more snow support brackets. In other embodiments, the shape of the elongated snow support 106 is consistent along its entire length such that the entire length of the elongated snow support 106 provides an upper mounting flange 122 and lower mounting flange 124. In some embodiments, the snow support surface 108 extends upwardly between the upper mounting flange 122 and the lower mounting flange 124.

Figure 5:
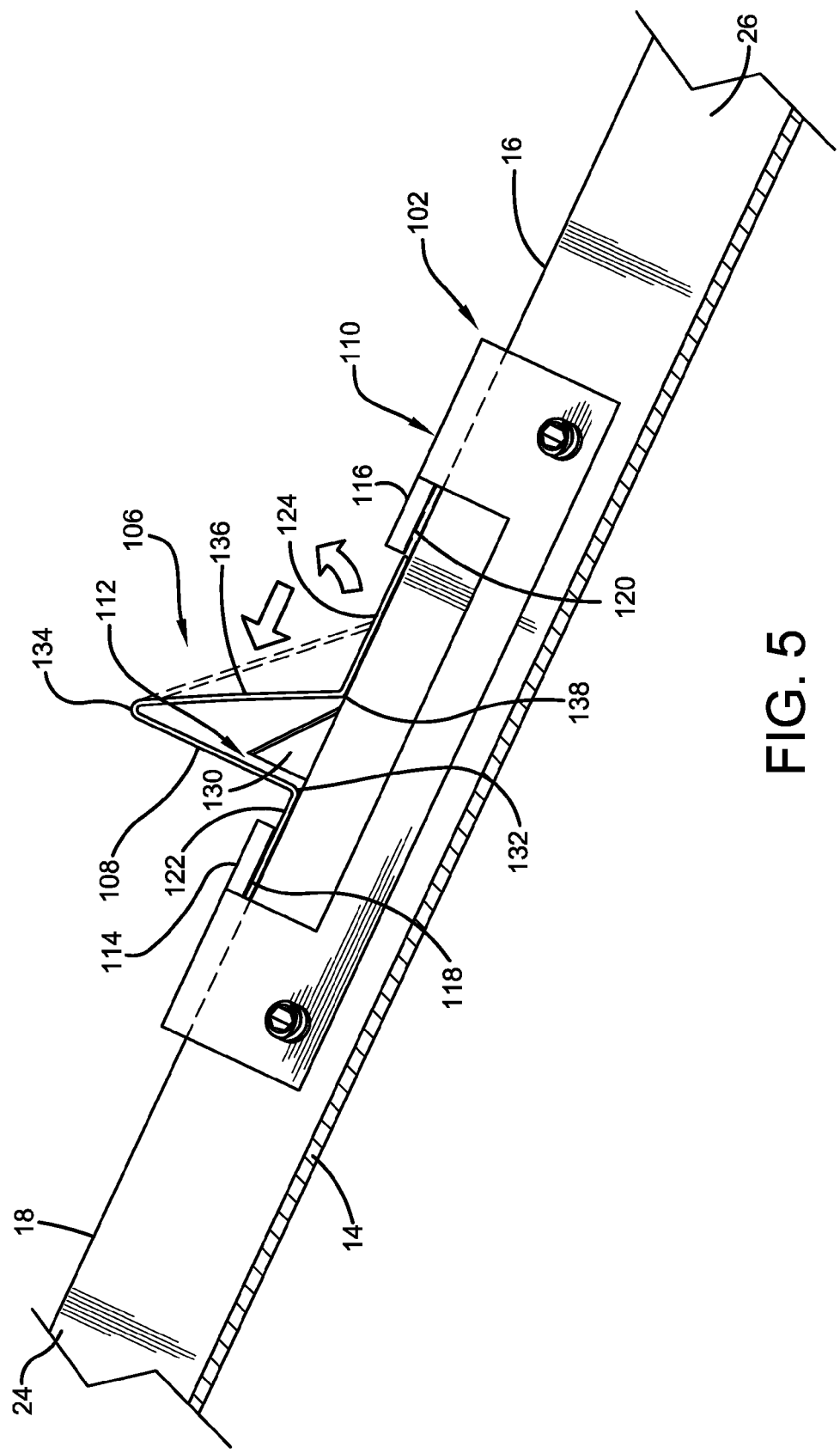
FIG. 5 is a cross section as in FIG. 2, but shown with the elongated snow support squeezed and deformed to remove the elongated snow support from the snow support bracket.

In some embodiments, the elongated snow support 106 is deformable at the location where it is received in a snow support bracket. More particularly, the snow support is deformable such that the width at the location of a snow support receptacle can be decreased to avoid one of the upper overhang and lower overhang in order to remove to the elongated snow support from receipt in the snow support receptacle. This is shown in FIG. 5, wherein the elongated snow support 106 has been deformed to withdraw a lower mounting flange 124 from receipt under the lower overhang 120 of a snow support bracket 102. In such embodiments, the elongated snow support 106 can be installed on multiple snow support brackets by deforming the elongated snow support at proper locations to insert the upper mounting flange 122 under the upper overhang 118 and the lower mounting flange 124 under the lower overhang 120.

In some embodiments, the bracket body 110 of the snow support bracket 102 includes a stopper 130 extending upwardly between the upper flange 114 and lower flange 116. This stopper is positioned such that the weight of snow on snow support surface 108 is not capable of deforming the elongate snow support 106 sufficiently to remove the upper mounting flange 122 from underneath the overhang 118. This can prevent the elongated snow support 106 from being forced out of the snow support receptacle 112 by the weight of snow S. More particularly, it should be understood that the snow support surface 108 of the elongated snow support 106 could be pressed away from flange 114 due to the weight of snow/ice being supported by the elongated snow support 106. This weight could become sufficient enough to force the upper mounting flange 122 out from under the overhang 118 formed by upper flange 114, but the stopper 130 prevents this.

In some embodiments the elongated snow support 106 has a snow support surface 108 extending upwardly from a bend 132 at the lower end of the upper mounting flange 122. The snow support surface 108 extends upwardly to a peak 134 and then has a brace surface 136 extending downwardly from peak 134 to a bend 138 at the upper end of the lower mounting flange 124. The peak 134 can be sharp or rounded in this embodiment. The elongated snow support 106 of this embodiment can have a general right-angle triangle shape. In such embodiments, the stopper 130, if employed, can mimic the shape of the elongated snow support 106.

In some embodiments, the snow support brackets are secured to their respective standing seams without forming holes in the standing seam metal roof. This can be achieved in many ways. In this embodiment, as appreciated from FIGS. 2 and 4, the snow support bracket 102 is secured to a standing seam 16 by blunted mounting screws 140 extending through threaded apertures 142 in the opposed sidewalls of the bracket body 110. The blunted mounting screws 140 are threaded through the threaded apertures 142 to engage a surface of the standing seam 16 and secure the bracket thereto by friction fit. The screws 140 through one sidewall of bracket body 110 engage one side of the standing seam 16, while the screws 140 through the opposed sidewall of the bracket body 110 engage the other side of the standing seam, thus securing the bracket body 110. In some embodiments, the distal ends of the mounting screws 140 can have a cushion material 144, such as rubber or the like. This can prevent marring of the standing seam and improve friction.

As seen in FIG. 1, a plurality of snow guard assemblies 100 can be mounted to a standing seam metal roof 10 in a staggered manner. Although FIG. 1 shows two snow guard assemblies 100 not overlapping in a vertical direction from the lower ledge 22 to the upper ridge 20, as many or as few desired snow guard assemblies 100 can be employed in an overlapping or non-overlapping manner, though a thorough treatment of roof 10 would entail employing a multitude of snow guard assemblies 100 and preferably overlapping.

Figure 6:
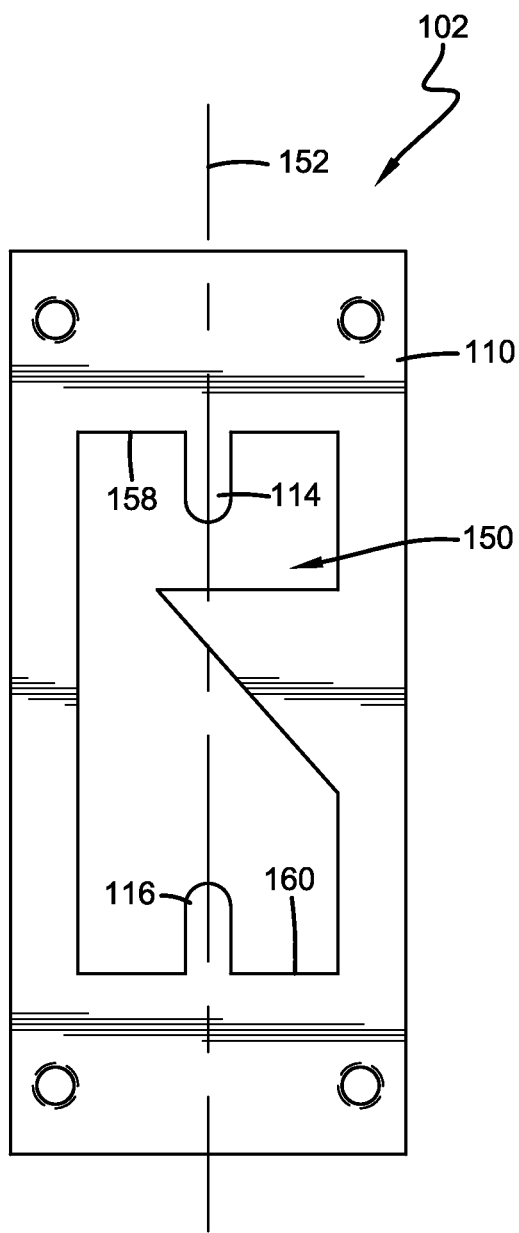
FIG. 6 is a top plan view of a snow support bracket shown stamped from a flat material and before bent to form the snow support bracket as shown in FIG. 4.

With reference to FIG. 6 it can be seen that, in some embodiments, the snow support brackets can be easily formed from a flat piece of material. This is disclosed by showing snow support bracket 102 in a flat form, before being bent to conclude the bracket structure necessary for securing to a standing seam as disclosed above. The bracket body 110 has an aperture 150 stamped out of it, the aperture defining the upper flange 114 and lower flange 116, and, if desired, stopper 130. In some embodiments, the upper flange 114 and lower flange 116 are positioned along a bend line 152 along which the bracket body 110 is bent to form the channel 111, placing the upper flange 114 and the lower flange 116 along the ridge 156 (FIG. 4) of the arcuate structure thus formed. In other embodiments, the ridge 156 presents a flatter, less rounded joinder of the opposed sidewalls, yet can still be considered arch shaped. In some embodiments, this structure mimics the standing seam shape. In some embodiments, the upper flange 114 extends from an upper periphery 158 of the aperture 150 and the lower flange 116 extends from a lower periphery 160 of the aperture 150. In some embodiment, if a stopper 130 is employed, it extends from a periphery 162 of the aperture to extend beyond the bend line 152 such that, when the body 110 is bent at the bend line 152 to form the channel 111, the stopper 130 extends above the upper and lower flanges 114, 116.

In some embodiments the snow support brackets are made of materials selected from metals and plastics. In some embodiments the elongated snow support is made of materials selected from metals and plastics. In some embodiments, both are made of metal.

It should be appreciated that the present invention significantly advances the art by providing a new snow guard assembly on a standing seam metal roof.

What is claimed is:

1. A snow guard assembly on a standing seam metal roof, the standing seam metal roof having a plurality of roofing segments, each roofing segment having a panel and a standing seam forming a ridge with a neighboring roofing segment, said standing seams being raised above the level of the panels, the snow guard assembly comprising:

a first snow support bracket including a first bracket body secured to a first standing seam and having a first snow support receptacle including an upper flange creating an upper overhang and an opposed lower flange creating a lower overhang, said first snow support bracket being formed of a single piece of material bent at a bend line, and said upper overhang and said lower overhang of said first snow support bracket are positioned along said bend line;

a second snow support bracket including a second bracket body secured to a second standing seam and having a second snow support receptacle including an upper flange creating an upper overhang and an opposed lower flange creating a lower overhang, said second snow support bracket being formed of a single piece of material bent at a bend line, and said upper overhang and said lower overhang of said second snow support bracket are positioned along said bend line; and an elongated snow support separate and distinct from said first and second snow support brackets, said elongate snow support being removably received in said first support receptacle and said second support receptacle, wherein said elongated snow support has a mounted width at said first snow support receptacle such that said elongated snow support extends under said upper overhang thereof and under said lower overhang thereof, and wherein said elongated snow support has a mounted width at said second snow support receptacle such that said elongated snow support is received under said upper overhang thereof and under said lower overhang thereof, said elongated snow support having a snow support surface extending upwardly relative to the panel of a roofing segment over which it is mounted such that the snow support surface will support snow accumulating on the standing seam metal roof and reduce its ability to slide off the standing seam metal roof.

2. The snow guard assembly of claim 1, wherein said first bracket body is secured to a first standing seam without forming holes in said standing seam metal roof, and said second bracket body is secured to a second standing seam without forming holes in said standing seam metal roof.

3. The snow guard assembly of claim 2, wherein blunted mounting screws mount said first bracket body to said first standing seam, said blunted mounting screws mating with mounting screw apertures in said first bracket body; and blunted mounting screws mount said second bracket body to said second standing seam, said blunted mounting screws mating with mounting screw apertures in said second bracket body.

4. The snow guard assembly of claim 3, wherein said first bracket body is arch-shaped defining a channel that fits over said first standing seam and said second bracket body is arch-shaped defining a channel that fits over said second standing seam.

5. The snow guard assembly as in claim 1, wherein the elongated snow support includes an upper mounting flange received under said upper overhang of said first snow support receptacle.

6. The snow guard assembly of claim 5, wherein said upper mounting flange is also received under said upper overhang of said second snow support receptacle.

7. The snow guard assembly of claim 6, wherein said lower mounting flange is also received under said lower overhang of said second snow support receptacle.

8. The snow guard assembly of claim 5, wherein said snow support surface extends upwardly between said upper mounting flange and said lower mounting flange.

9. The snow guard assembly as in claim 5, wherein the elongated snow support includes a lower mounting flange received under said lower overhang of said first snow support receptacle.

10. The snow guard assembly of claim 5, wherein the standing seam metal roof defines an upper ridge and a lower edge, and said snow support surface faces said upper ridge.

11. The snow guard assembly of claim 1, wherein the elongated snow support has a length extending over a plurality of roofing segments and said snow support surface extends along at least a portion of said length in a direction transverse to the direction of the ridge formed by a standing seam over which said elongate snow support is mounted.

12. The snow guard assembly of claim 1, wherein the elongated snow support extends over a plurality of roofing segments of the standing seam metal roof.

13. The snow guard assembly of claim 1, wherein said second snow guard bracket is substantially aligned with said first snow guard bracket.

14. The snow guard assembly of claim 1, wherein said elongated snow support is deformable at said first snow support receptacle such that the width at said first snow support receptacle can be decreased to avoid one of said upper overhang or said lower overhang to remove said elongate snow support from receipt in said first snow support receptacle.

15. The snow guard assembly of claim 14, wherein said elongated snow support is deformable at said second snow support receptacle such that the width at said second snow support receptacle can be decreased to avoid one of said upper overhang or said lower overhang to remove said elongate snow support from receipt in said second snow support receptacle.

16. A snow guard assembly on a standing seam metal roof, the standing seam metal roof having a plurality of roofing segments, each roofing segment having a panel and a standing seam forming a ridge with a neighboring roofing segment, said standing seams being raised above the level of the panels, the snow guard assembly comprising:
   a first snow support bracket including a first bracket body secured to a first standing seam and having a first snow support receptacle including an upper flange creating an upper overhang and an opposed lower flange creating a lower overhang;
   a second snow support bracket including a second bracket body secured to a second standing seam and having a second snow support receptacle including an upper flange creating an upper overhang and an opposed lower flange creating a lower overhang; and
   an elongated snow support separate and distinct from said first and second snow support brackets, said elongate snow support being removably received in said first support receptacle and said second support receptacle, wherein said elongated snow support has a mounted width at said first snow support receptacle such that said elongated snow support is received between said ridge of said first standing seam and both said upper overhang and said lower overhang of said first snow support receptacle, and wherein said elongated snow support has a mounted width at said second snow support receptacle such that said elongated snow support is received between said ridge of said second standing seam and both said upper overhang and said lower overhang of said second snow support receptacle, said elongated snow support having a snow support surface extending upwardly relative to the panel of a roofing segment over which it is mounted and extending upwardly between said upper flange and said lower flange of said such that the snow support surface will support snow accumulating on the standing seam metal roof and reduce its ability to slide off the standing seam metal roof.

17. The snow guard assembly of claim 16, wherein said elongated snow support is deformable, wherein the elongated snow support includes an upper mounting flange received between said ridge of said first standing seam and said upper overhang of said first snow support receptacle, and wherein said first snow support bracket includes a stopper extending upwardly between the upper flange and lower flange of said first snow support bracket, said stopper positioned such that said snow support surface is not capable of deforming sufficiently at said first snow support bracket to remove said upper mounting flange of from between said ridge of said first standing seam and said upper overhang of said first snow support receptacle.

\* \* \* \* \*